United States Patent
Tsuboi et al.

(10) Patent No.: US 8,249,637 B2
(45) Date of Patent: Aug. 21, 2012

(54) WIRELESS COMMUNICATION DEVICE AND COMMUNICATION METHOD OF WIRELESS COMMUNICATION DEVICE

(75) Inventors: Tsutomu Tsuboi, Kanagawa (JP); Izuru Yamada, Yokohama (JP); Hiroki Ichikawa, Ayase (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 214 days.

(21) Appl. No.: 12/838,415

(22) Filed: Jul. 16, 2010

(65) Prior Publication Data

US 2011/0021233 A1 Jan. 27, 2011

(30) Foreign Application Priority Data

Jul. 27, 2009 (JP) ................................. 2009-173877

(51) Int. Cl.
*H04B 7/00* (2006.01)
(52) U.S. Cl. ........ 455/513; 455/512; 455/454; 455/464; 455/515
(58) Field of Classification Search .................. 455/513, 455/512, 454, 464, 515, 68, 3.01, 453, 67.11; 370/532, 442, 345, 347, 235, 428, 352, 329, 370/328, 85.4, 338, 445, 253, 337, 254; 709/231, 709/232
See application file for complete search history.

(56) References Cited

U.S. PATENT DOCUMENTS

| 4,594,591 | A * | 6/1986 | Burke | 340/3.9 |
|---|---|---|---|---|
| 5,081,623 | A * | 1/1992 | Ainscow | 370/451 |
| 6,278,691 | B1 * | 8/2001 | Ohyama et al. | 370/235 |
| 6,307,863 | B1 * | 10/2001 | Moulsley | 370/442 |
| 6,778,557 | B1 * | 8/2004 | Yuki et al. | 370/468 |
| 6,954,797 | B1 * | 10/2005 | Takeda et al. | 709/236 |
| 2003/0189922 | A1 * | 10/2003 | Howe | 370/352 |
| 2004/0136408 | A1 * | 7/2004 | Tomobe et al. | 370/532 |
| 2007/0014268 | A1 * | 1/2007 | Kim et al. | 370/338 |
| 2009/0135760 | A1 | 5/2009 | Urushihara et al. | |
| 2009/0303939 | A1 * | 12/2009 | Umesh et al. | 370/329 |
| 2010/0003979 | A1 * | 1/2010 | Iwamura et al. | 455/436 |
| 2010/0151877 | A1 * | 6/2010 | Lee et al. | 455/453 |
| 2010/0165920 | A1 * | 7/2010 | Chen | 370/328 |

FOREIGN PATENT DOCUMENTS

| JP | 2007-116672 A | 5/2007 |
|---|---|---|
| JP | 2008-131574 A | 6/2008 |

* cited by examiner

*Primary Examiner* — Tan Trinh
(74) *Attorney, Agent, or Firm* — Miles & Stockbridge P.C.

(57) ABSTRACT

An object of the present invention is to provide means for eliminating a transmission delay when transmitting emergency information for the sake of relief, security, or the like in a wireless device in conformity with the wireless LAN standard in which if radio waves transmitted from peripheral devices are detected, transmission has to be stopped. In a multimode wireless communication scheme having two or more communication schemes, priorities of the communication schemes are set. A high priority or low priority regarding to a message is described in a "message type" data field of a frame of a controlling channel output from the access point side to the terminal side. When the frame of the controlling channel is decrypted on the terminal side, the message type is confirmed, so that the type of a service channel used thereafter is confirmed and the channel is coupled.

3 Claims, 3 Drawing Sheets

WIRELESS COMMUNICATION DEVICE AND COMMUNICATION METHOD OF WIRELESS COMMUNICATION DEVICE

CROSS-REFERENCE TO RELATED APPLICATIONS

The disclosure of Japanese Patent Application No. 2009-173877 filed on Jul. 27, 2009 including the specification, drawings and abstract is incorporated herein by reference in its entirety.

BACKGROUND OF THE INVENTION

The present invention relates to a scheme of avoiding a transmission delay caused by waiting for transmission of emergency information in an ITS (intelligent transportation system) which supports both of emergency information and various nonemergency service information.

As means for realizing a multimode wireless communication scheme, there is known a cognitive wireless communication. The cognitive wireless communication is a concept of a wireless communication scheme which manages wireless schemes and a usage status of radio waves, changes a parameter used in transmission and reception by a network and a wireless node to avoid interference, and enables efficient communications.

In the cognitive wireless communication, all of wireless communication states are recognized on the network side. Accordingly, no waiting state occurs because a newly-switched channel is already in a usable state. However, it is necessary to manage and control all of the wireless communication states on the network side, resulting in a problem of an increased system scale (development and maintenance costs).

In a narrow band wireless system compliant with the wireless LAN standard (IEEE802.11), if detecting radio waves are transmitted from peripheral devices, it is necessary to stop wireless transmission at the channel (wireless communication band). Thus, there is a possibility that a waiting state of transmission occurs. Such kind of systems have a problem to avoid a waiting state of emergency wireless communications.

Japanese Unexamined Patent Publication No. 2007-116672 provides a multimode wireless communication device in which a multimode wireless terminal includes: a reconfigurable signal processing unit which switches a wireless communication scheme; a controlling unit which gives a switching instruction of the communication scheme and an instruction of a switching method of the communication scheme to the reconfigurable signal processing unit on the basis of a combination of the switching methods of the communication scheme; a switch setting determination unit which obtains communication environment information from the controlling unit, obtains a switch setting determination coefficient from a determination information storing unit, determines a combination, and gives an instruction of the combination to the controlling unit; and a determination information storing unit which holds the switch setting determination coefficient. The multimode wireless communication device is compliant with a plurality of types of wireless communication schemes, and performs communications while switching the communication scheme, so that a switching method of an optimum wireless communication scheme can be automatically selected in accordance with communication environments.

Further, in Japanese Unexamined Patent Publication No. 2008-131574, a controlling unit calculates an index value indicating an impact of interference of its node on adjacent nodes on the basis of communication load information of its node and all of the adjacent nodes and communication capacity information available for its node, exchanges a routing table in which the index values relating to the respective nodes are stored with other nodes, evaluates a candidate of a communication route from its node to the destination node on the basis of the index value relating to a relay node on the communication route, and selects the communication route. In addition, Japanese Unexamined Patent Publication No. 2008-131574 presents a method in which in the case where a multi-hop network is configured using wireless stations (nodes) having a cognitive communication function, when an end-to-end communication route is selected, an impact of frequency channel interference of a newly-switched node on peripheral nodes caused by switching the communication route is reduced.

SUMMARY OF THE INVENTION

In the technique described in Japanese Unexamined Patent Publication No. 2007-116672, there is described a concept of a method of changing a circuit when multimode communications are realized using software wireless communications. However, neither a switching concept as a system including peripheral devices nor a concept of switching a wireless communication scheme using a plurality of wireless modules is described.

Further, in Japanese Unexamined Patent Publication No. 2008-131574, there is described a concept of switching a communication route in the cognitive wireless communication. However, a concrete switching method is not described.

In addition, in order to prevent the disturbance of an image quality caused by discontinuity of data communications of service channels due to the presence of a controlling channel when a streaming service is provided on the service channels, it is necessary to provide a buffer memory with a capacity in accordance with an interrupt time by the controlling channel to secure continuity of data read from a memory, which results in an increased size of an LSI chip and an increased cost of an LSI.

Further, the controlling channel (Cch) is supposedly used only in communication frequencies, a wireless communication scheme, and transmission of emergency information. Accordingly, information is not always continuously transmitted, and radio waves are not transmitted most of the time. The service channel (Sch) is used for transmission of various pieces of information such as streaming information. According to the presence of a plurality of devices, radio waves transmitted from the different devices at the same timing supposedly interfere with each other.

An object of the present invention is to provide means for eliminating a transmission delay when transmitting emergency information for the sake of relief, security, or the like in a wireless device in conformity with the wireless LAN standard in which if radio waves transmitted from peripheral devices are detected, transmission has to be stopped.

The above and other objects and novel features of the present invention will become apparent from the description and the accompanying drawings of the present specification.

The followings are summarized descriptions of representative aspects of the present invention disclosed in this application.

According to a representative embodiment of the present invention, there is provided a wireless communication device compliant with wireless communication schemes having a controlling channel shared by a plurality of wireless communication terminals linked to base stations, a first high-priority service channel, and a second low-priority service channel, the wireless communication device including: a controlling channel communication unit which performs communications through the controlling channel; a first service channel transmission/reception unit which performs communications through the first service channel; a second service channel transmission/reception unit which performs communications through the second service channel; a controlling unit; a frequency setting unit; and an interference detecting unit, in which the controlling unit; decrypts a frame of the controlling channel received by the controlling channel communication unit; detects a communication priority of the frame if the decrypted frame is a communication request to its terminal; allows the interference detecting unit to detect a usage status of a frequency used on the basis of the communication priority; allows the frequency setting unit to set the operation frequency of the first service channel transmission/reception unit and allows the interference detecting unit to confirm the availability of the channel to be used when the high-priority frame can be coupled; and allows the frequency setting unit to set the operation frequency of the second service channel transmission/reception unit and allows the interference detecting unit to confirm the availability of the channel to be used when the low-priority frame can be coupled.

In the wireless communication device, the controlling unit may determine a priority using a message type data field of the frame.

According to another representative embodiment of the present invention, there is provided a communication method of a wireless communication device compliant with wireless communication schemes having a controlling channel shared by a plurality of wireless communication terminals linked to base stations, a first high-priority service channel, and a second low-priority service channel, the wireless communication device including: a controlling channel communication unit which performs communications through the controlling channel; a first service channel transmission/reception unit which performs communications through the first service channel; a second service channel transmission/reception unit which performs communications through the second service channel; a controlling unit; a frequency setting unit; and an interference detecting unit, the communication method allowing the controlling unit to perform the steps of: decrypting a frame of the controlling channel received by the controlling channel communication unit; extracting a message type data field from the decrypted frame; selecting and determining any one of the first service channel transmission/ reception unit and the second service channel transmission/ reception unit for use after obtaining, on the basis of the extracted message type data field, the priority of the service channel coupled by the controlling unit; allowing the interference detecting unit to detect the availability of an expected frequency used by the selected and determined service channel transmission/reception unit; and allowing the frequency setting unit to set the selected and determined service channel transmission/reception unit at the available frequency detected by the interference detecting unit.

The followings are summarized effects obtained from the representative aspects of the present invention disclosed in this application.

In the multimode wireless communication scheme according to the representative embodiment of the present invention, a plurality of wireless channels are used according to need. Specifically, a wireless channel for communications of large-volume service information is provided separately from a wireless channel for communications of small-volume emergency information. As a result, a line usage rate of the wireless channel for communications of the emergency information can be decreased, thus reducing the provability of occurrence of waiting for transmission according to the wireless LAN standard (IEEE802.11). As a result, when the emergency information is transmitted, it is possible to advantageously eliminate a transmission delay caused by waiting for transmission.

DETAILED DESCRIPTION OF THE PREFERRED EMBODIMENTS

Hereinafter, an embodiment of the present invention will be described using the drawings.

Figure 1:
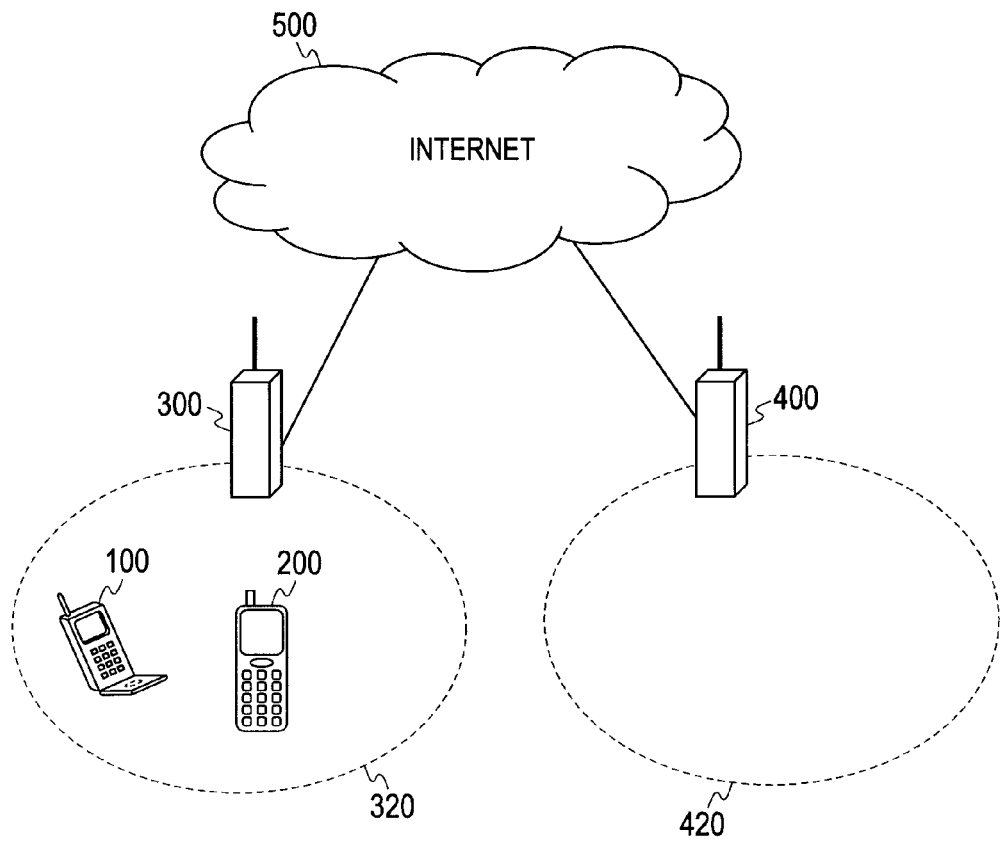
FIG. 1 is a configuration diagram for showing a system configuration of a multimode wireless communication scheme according to the present invention.
Figure 2:
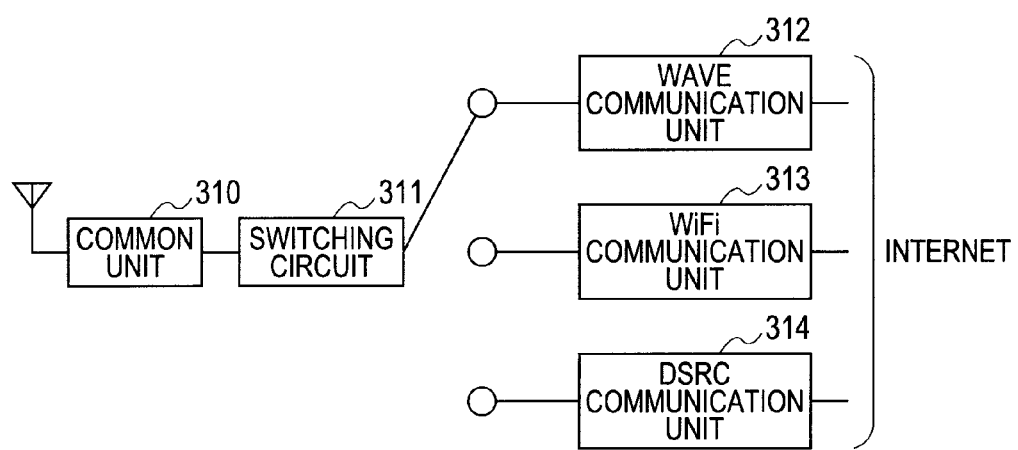
FIG. 2 is a configuration diagram for showing a configuration of an access point used in the multimode wireless communication scheme according to the present invention.
Figure 3:
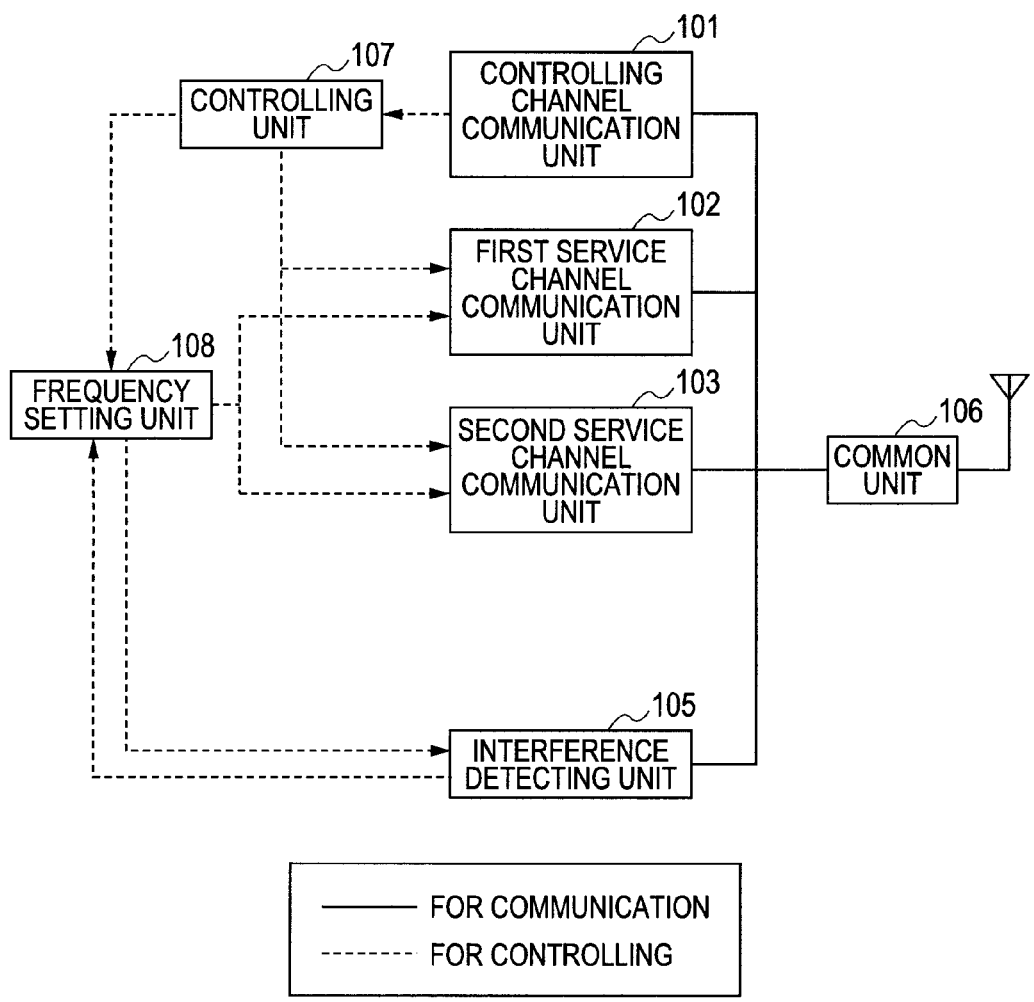
FIG. 3 is a configuration diagram of a terminal used in the multimode wireless communication scheme according to the present invention.

FIG. 1 is a configuration diagram for showing a system configuration of a multimode wireless communication scheme according to the present invention. FIG. 2 is a configuration diagram for showing a configuration of an access point (base station) used in the multimode wireless communication scheme. Further, FIG. 3 is a configuration diagram of a terminal used in the multimode wireless communication scheme.

In the multimode wireless communication scheme, an access point 300 and an access point 400 are coupled to each other via the Internet 500. Each of the access points has an access point area in a predetermined range where terminals can be communicated with the corresponding access point. In FIG. 1, the access point 300 has an access point area 320, and the access point 400 has an access point area 420. If terminals 100 and 200 are located in the access point areas, the terminals can be communicated with each other through the corresponding access points.

Each of the access points in the embodiment is comprised of a common unit 310, a switching circuit 311, a WAVE communication unit 312, a WiFi communication unit 313, and a DSRC communication unit 314.

The common unit 310 is an integrated circuit which includes a variable mechanism and can be shared in accordance with communication schemes (the WAVE communication unit 312, the WiFi communication unit 313, the DSRC communication unit 314, and the like) when adjusting filters, amplifiers, and feeding points. It should be noted that all of the filters and the amplifiers may be included in circuits which are dependent on the communication schemes of the WAVE communication unit 312 and the like.

The switching circuit 311 is a switch for switching one of the circuits which are dependent on the communication schemes of the WAVE communication unit 312 and the like.

The WAVE communication unit 312 is a transmission/ reception circuit compliant with the WAVE (Wireless Access in Vehicle Environment) standard for vehicles. The WAVE standard is compliant with a frequency band of 5.9 GHz. The WAVE communication unit 312 includes a controlling channel and one or more service channels which are compliant with the WAVE standard.

The WiFi communication unit 313 is a transmission/reception circuit compliant with a WiFi (Wireless Fidelity). The WiFi is the interconnection authentication standard of IEEE802.11, and is accordingly changed across the ages. However, the WiFi is compliant with respective frequency bands of 2.4 GHz (IEEE802.11b), 4.9 GHz (IEEE802.11j), and 5 GHz (IEEE802.11j). It is assumed that the WiFi communication unit 313 includes one or more service channels.

The DSRC communication unit 314 is a transmission/reception circuit compliant with a DSRC (Dedicated Short Range Communication) in conformity with IEEE802.11P employed in a fare collection system (known as an ETC in Japan). It is assumed that the DSRC communication unit 314 is compliant with respective frequency bands of 5.8 GHz and 700 MHz. The DSRC has one or more service channels because it is compliant with IEEE802.11 as described above.

The access point areas of the access points become wider or narrower depending on these communication standards. Although there is an area where only a part of the standards can be used, areas where all of three standards can be used are referred to as the access point areas of the access points in the embodiment.

Further, the WAVE communication unit 312, the WiFi communication unit 313, and the DSRC communication unit 314 are independently operated. In addition, these are coupled to the Internet.

In the access point 300, the WAVE communication unit 312 is associated with the controlling channel and one or more service channels, the DSRC communication unit 314 is associated with one or more high-priority service channels, and the WiFi communication unit 313 is associated with one or more low-priority service channels.

Next, the terminals 100 and 200 will be described.

Each of the terminals is comprised of a controlling channel communication unit 101, a first service channel communication unit 102, a second service channel communication unit 103, an interference detecting unit 105, a common unit 106, a controlling unit 107, and a frequency setting unit 108.

The controlling channel communication unit 101 is a transmission/reception circuit for operating the controlling channel of the IEEE802.11p (WAVE) standard. Specifically, the controlling channel communication unit 101 is a communication module which makes a pair with the WAVE communication unit 312. The controlling channel is a common channel used for the all terminals coupled to the same access point. Frames delivered in the controlling channel are decrypted by the controlling unit 107. In the case where an ID for identifying its terminal is included in the controlling channel after decryption, it is identified as a call for its terminal.

The first service channel communication unit 102 and the second service channel communication unit 103 are transmission/reception circuits for operating the service channels. In each of the terminals, it is assumed that the first service channel communication unit 102 is associated with the high-priority service channels, and the second service channel communication unit 103 is associated with the low-priority service channels.

As described above, in the case where the DSRC communication unit 314 is associated with the high-priority service channels and the WiFi communication unit 313 is associated with the low-priority service channels, the first service channel communication unit 102 is communicated with the DSRC communication unit 314 while making a pair, and the second service channel communication unit 103 is communicated with the WiFi communication unit 313 while making a pair.

The interference detecting unit 105 is a circuit for determining whether or not a frequency band to be used is already used by another terminal. Use of an already-used frequency band results in interference. It is necessary for the interference detecting unit 105 to detect interference of the frequency bands used for the WiFi communication unit 313 and the DSRC communication unit 314.

The common unit 106 is an integrated circuit which includes a variable mechanism and can be shared in accordance with the communication schemes when adjusting filters, amplifiers, and feeding points.

The controlling unit 107 is a controlling circuit for controlling an operation of the frequency setting unit 108 so that the first service channel communication unit 102 and the second service channel communication unit 103 are associated with any of the communication schemes. Further, the controlling unit 107 decrypts internal data of the controlling channel which are transmitted from the controlling channel communication unit 101.

The frequency setting unit 108 is a setting circuit for setting frequencies used for the first service channel communication unit 102, the second service channel communication unit 103, and the interference detecting unit 105.

Figure 4:
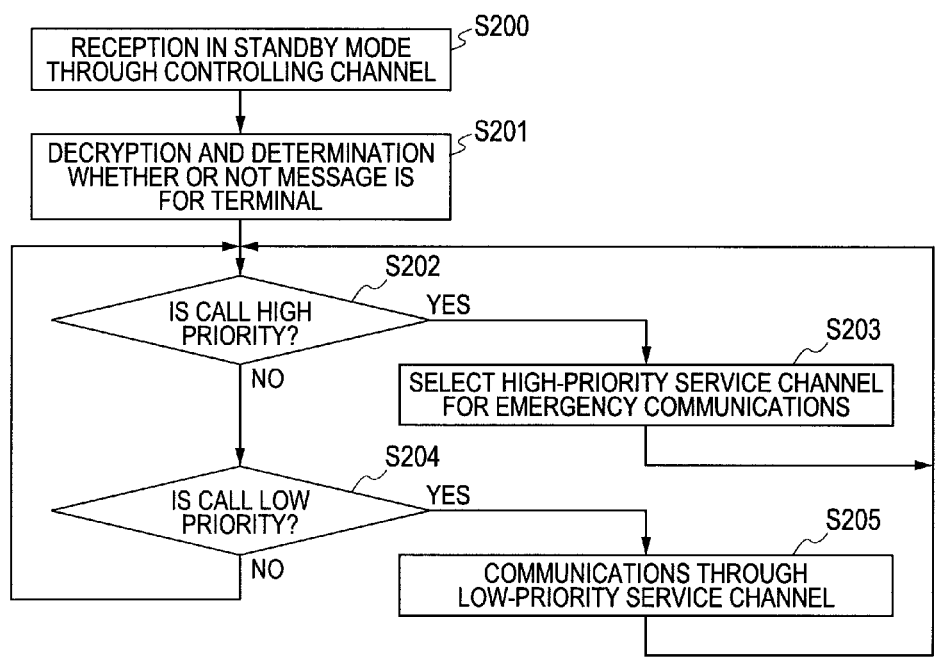
FIG. 4 is a flowchart for showing a controlling channel processing operation of the terminal according to the present invention.

Next, an operation of the terminal will be described using FIG. 4. FIG. 4 is a flowchart for showing a controlling channel processing operation of the terminal according to the present invention.

In a standby mode, the terminal allows the controlling channel communication unit 101 to receive a downlink controlling channel (S200). The received controlling channel is initially decrypted to confirm whether or not it has been transmitted to the terminal (S201). Hereinafter, the flowchart will be described on the assumption that the frame has been transmitted to the terminal.

Figure 5:
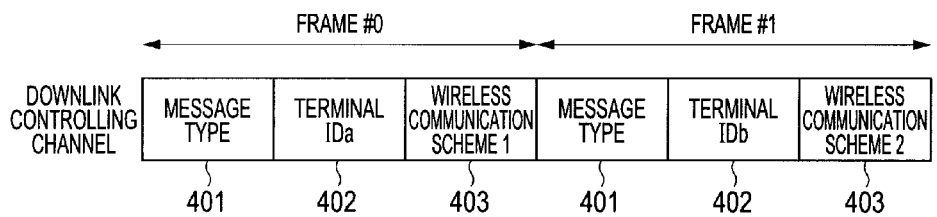
FIG. 5 is a configuration diagram for showing a frame configuration of a controlling channel to be received.

FIG. 5 is a configuration diagram for showing a frame configuration of the received controlling channel.

The downlink controlling channel is comprised of frames, each including a message type 401, a terminal ID 402, and a wireless communication scheme 403. The frames are continuously or intermittently output on the controlling channel. It is assumed in FIG. 5 that a frame #0 and a frame #1 are continuously output.

The message type 401 is a data field representing the type of a message included in the frame. Data described in the message type 401 include a priority. A high priority is set for an emergency call.

The terminal ID 402 is a data field describing a terminal ID for specifying a terminal to be called. When the controlling channel is decrypted, the terminal initially confirms the data field to confirm whether or not the message is for the terminal. In Step S201, it is determined whether or not the message is for the terminal by checking the terminal ID.

The wireless communication scheme 403 is a data field for specifying a service channel used when coupling. Instead of "scheme name", an identifier or the like may be input in the wireless communication scheme 403.

FIG. 4 will be described again.

In the case where the message is a high-priority emergency call on the basis of the result of the determination (S202: Yes), the first service channel communication unit 102 is started. After starting the first service channel communication unit 102, the controlling unit 107 allows the frequency setting unit 108 to confirm a frequency usage status of another terminal obtained by the interference detecting unit 105.

Thereafter, the frequency setting unit 108 sets a frequency at which the fastest communications can be performed among available bands detected by the interference detecting unit 105, as a frequency for the first service channel communication unit 102. In addition, the frequency setting unit 108 also sets the common unit 106.

After these settings, the terminal is coupled to the Internet 500 through the first service channel communication unit 102, the common unit 106, and the corresponding communication unit of the access point being coupled (Step S203).

In the case where the priority of the call decrypted by the controlling unit 107 is low (S204: Yes), the second service channel communication unit 103 is started. After starting the second service channel communication unit 103, the controlling unit 107 allows the frequency setting unit 108 to confirm a frequency usage status of another terminal obtained by the interference detecting unit 105.

Thereafter, the frequency setting unit 108 sets a frequency at which the fastest communications can be performed among available bands detected by the interference detecting unit 105, as a frequency for the second service channel communication unit 103. In addition, the frequency setting unit 108 also sets the common unit 106.

After these settings, the terminal is coupled to the Internet 500 through the second service channel communication unit 103, the common unit 106, and the corresponding communication unit of the access point being coupled (Step S205).

It is assumed that the first service channel communication unit 102 is compliant with the WAVE standard and the second service channel communication unit is compliant with the WiFi or DSRC in the present invention. However, the present invention is not necessarily limited thereto.

In such a configuration, a low-priority wireless channel for communications of large-volume service information is provided separately from a high-priority wireless channel for communications of small-volume emergency information. Accordingly, a line usage rate of the wireless channel for communications of the emergency information can be decreased, thus reducing the provability of occurrence of waiting for transmission according to the wireless LAN standard (IEEE802.11). As a result, when the emergency information is transmitted, it is possible to eliminate a transmission delay caused by waiting for transmission.

The invention achieved by the inventors has been concretely described above on the basis of the embodiment. However, it is obvious that the present invention is not limited to the above-described embodiment, but may be variously changed in a range without departing from the gist of the present invention.

The present invention has been described with regard to a method of using the controlling channel at the time of an emergency call in the multimode wireless communication scheme. However, the present invention is not to emergency communications, but can be applied to a communication scheme which accepts high and low priorities using a controlling channel.

What is claimed is:

1. A wireless communication device compliant with wireless communication schemes including a controlling channel shared by a plurality of wireless communication terminals linked to base stations, a first high-priority service channel, and a second low-priority service channel, the wireless communication device comprising:
   a controlling channel communication unit which performs communications through the controlling channel;
   a first service channel transmission/reception unit which performs communications through the first service channel;
   a second service channel transmission/reception unit which performs communications through the second service channel;
   a controlling unit;
   a frequency setting unit; and
   an interference detecting unit,
   wherein the controlling unit: decrypts a frame of the controlling channel received by the controlling channel communication unit; detects a communication priority of the frame if the decrypted frame is a communication request to its terminal; allows the interference detecting unit to detect a usage status of a frequency used on the basis of the communication priority; allows the frequency setting unit to set the operation frequency of the first service channel transmission/reception unit and allows the interference detecting unit to confirm the availability of the channel to be used when the high-priority frame can be coupled; and allows the frequency setting unit to set the operation frequency of the second service channel transmission/reception unit and allows the interference detecting unit to confirm the availability of the channel to be used when the low-priority frame can be coupled.

2. The wireless communication device according to claim 1,
   wherein the controlling unit determines a priority using a message type data field of the frame.

3. A communication method of a wireless communication device compliant with wireless communication schemes including a controlling channel shared by a plurality of wireless communication terminals linked to base stations, a first high-priority service channel, and a second low-priority service channel, the wireless communication device comprising:
   a controlling channel communication unit which performs communications through the controlling channel;
   a first service channel transmission/reception unit which performs communications through the first service channel;
   a second service channel transmission/reception unit which performs communications through the second service channel;
   a controlling unit;
   a frequency setting unit; and
   an interference detecting unit,
   the communication method allowing the controlling unit to perform the steps of:
   decrypting a frame of the controlling channel received by the controlling channel communication unit;
   extracting a message type data field from the decrypted frame;
   selecting and determining any one of the first service channel transmission/reception unit and the second service channel transmission/reception unit for use after obtaining, on the basis of the extracted message type data field, the priority of the service channel coupled by the controlling unit;

allowing the interference detecting unit to detect the availability of an expected frequency used by the selected and determined service channel transmission/reception unit; and allowing the frequency setting unit to set the selected and determined service channel transmission/reception unit at the available frequency detected by the interference detecting unit.

* * * * *